United States Patent
Yuan et al.

(10) Patent No.: US 11,549,547 B2
(45) Date of Patent: Jan. 10, 2023

(54) LOCKING DEVICE AND CONNECTOR

(71) Applicants: Sibas Electronics (Xiamen) Co., Ltd, Xiamen (CN); Tyco Electronics (Shanghai) Co. Ltd., Shanghai (CN)

(72) Inventors: Qiang Yuan, Xiamen (CN); Shaowei Zeng, Xiamen (CN); Yong Wang, Shanghai (CN); Xiang Xu, Shanghai (CN)

(73) Assignees: Sibas Electronics (Xiamen) Co., Ltd., Xiamen (CN); Tyco Electronics (Shanghai) Co. Ltd., Shanghai (CN)

( * ) Notice: Subject to any disclaimer, the term of this patent is extended or adjusted under 35 U.S.C. 154(b) by 848 days.

(21) Appl. No.: 16/502,402

(22) Filed: Jul. 3, 2019

(65) Prior Publication Data

US 2019/0323547 A1    Oct. 24, 2019

Related U.S. Application Data

(63) Continuation of application No. PCT/EP2018/050127, filed on Jan. 3, 2018.

(30) Foreign Application Priority Data

Jan. 6, 2017 (CN) .......................... 201710010094.4

(51) Int. Cl.
*H01R 13/52* (2006.01)
*F16B 39/24* (2006.01)
(Continued)

(52) U.S. Cl.
CPC ............ *F16B 39/24* (2013.01); *F16B 43/001* (2013.01); *F16B 43/02* (2013.01); *H01R 13/512* (2013.01);
(Continued)

(58) Field of Classification Search
CPC ........ F16B 39/24; F16B 43/001; F16B 43/02; F16B 35/06; F16B 43/00; H01R 13/512;
(Continued)

(56) References Cited

U.S. PATENT DOCUMENTS 722,649 A    3/1903   Bartley
972,086 A   10/1910   Paterson
(Continued)

FOREIGN PATENT DOCUMENTS

EP    2565989 A1    3/2013

OTHER PUBLICATIONS

PCT Notification, The International Search Report and The Written Opinion of the International Searching Authority, dated Mar. 2, 2018, 14 pages.

*Primary Examiner* — Thanh Tam T Le
(74) *Attorney, Agent, or Firm* — Barley Snyder

(57) ABSTRACT

A locking device adapted to lock a shell to an installation body includes a thread connection member extending through a connecting hole in the shell and engaging a threaded hole in the installation body, a sealing ring sleeved on the thread connection member and adapted to be pressed on an installation surface of the shell to seal the connecting hole of the shell, and a gasket sleeved on the thread connection member and adapted to be pressed between the thread connection member and the sealing ring to prevent the thread connection member from being loosened. The gasket has a pair of stopping arms. An angle defined between the stopping arms is greater than 0 degrees and less than 180 degrees. A pair of top ends of the stopping arms are adapted to simultaneously abut against an outer wall of the shell to prevent the gasket from rotating with the thread connection member.

18 Claims, 7 Drawing Sheets

(51) Int. Cl.
*F16B 43/00* (2006.01)
*F16B 43/02* (2006.01)
*H01R 13/512* (2006.01)
*H01R 13/621* (2006.01)
*H01R 13/74* (2006.01)

(52) U.S. Cl.
CPC ...... *H01R 13/5202* (2013.01); *H01R 13/6215* (2013.01); *H01R 13/748* (2013.01)

(58) Field of Classification Search
CPC ............ H01R 13/5202; H01R 13/6215; H01R 13/748; H01R 13/5219
See application file for complete search history.

(56) References Cited

U.S. PATENT DOCUMENTS

| | | | | |
|---|---|---|---|---|
| 3,422,721 | A | 1/1969 | Yonkers | |
| 4,732,519 | A * | 3/1988 | Wagner | F16B 35/04 403/14 |
| 4,952,107 | A * | 8/1990 | Dupree | F16B 5/0208 411/103 |
| 5,094,579 | A * | 3/1992 | Johnson | F16B 35/041 411/970 |
| 5,397,206 | A * | 3/1995 | Sihon | F16F 7/00 411/970 |
| 6,059,503 | A * | 5/2000 | Johnson | F16B 41/002 411/353 |
| 6,280,132 | B1 * | 8/2001 | Szczukowski | F16B 5/0258 411/107 |
| 7,686,554 | B2 * | 3/2010 | Amann | F16B 43/00 411/533 |
| 8,922,999 | B2 * | 12/2014 | Lai | H01L 23/4006 165/185 |
| 10,184,503 | B2 * | 1/2019 | Mori | B62D 27/026 |
| 10,277,019 | B2 * | 4/2019 | Kosuga | H02M 7/48 |
| 10,323,678 | B2 * | 6/2019 | Hess | F16B 39/24 |
| 10,340,626 | B2 * | 7/2019 | Kondo | H01R 13/748 |
| 10,443,637 | B2 * | 10/2019 | Pinney | F16B 33/006 |
| 10,630,021 | B2 * | 4/2020 | Shiraishi | H01R 13/502 |
| 10,651,592 | B2 * | 5/2020 | Cerfeuillet | F16B 37/065 |
| 10,784,624 | B2 * | 9/2020 | Quast | H01R 13/633 |

* cited by examiner

LOCKING DEVICE AND CONNECTOR

CROSS-REFERENCE TO RELATED APPLICATIONS

This application is a continuation of PCT International Application No. PCT/EP2018/050127, filed on Jan. 3, 2018, which claims priority under 35 U.S.C. § 119 to Chinese Patent Application No. CN 201710010094.4, filed on Jan. 6, 2017.

FIELD OF THE INVENTION

The present invention relates to a connector and, more particularly, to a connector having a locking device.

BACKGROUND

A heavy load connector adapted to be mounted on an installation panel generally includes a shell, a flange, and a plurality of contacts. The contacts are received in the shell. The shell is locked to the flange by a locking device. The flange is adapted to be fixed to the installation panel. In this way, the heavy load connector may be mounted and fixed onto the installation panel.

The locking device generally comprises a screw, a sealing ring, and a gasket. The screw passes through a connection hole formed in the shell and is screwed into a threaded hole formed in the flange. The sealing ring is sleeved on the screw and adapted to be pressed on an installation surface of the shell, so as to seal the connection hole in the shell. The gasket is sleeved on the screw and adapted to be pressed between a head of the screw and the sealing ring, so as to prevent the screw from being loosened.

During tightening the screw, however, the screw will drive the gasket to rotate with it, and an installation surface of the shell may be worn by the gasket, which will destroy a protection coating on the shell and reduce the service life of the shell. Furthermore, the sealing ring may be also worn by the gasket when the gasket is rotated, which will damage the sealing ring and reduce the service life of the sealing ring. Thereby, after several locking and unlocking operations, the sealing ring is severely worn and damaged and cannot achieve a waterproof sealing effect.

SUMMARY

A locking device adapted to lock a shell to an installation body includes a thread connection member extending through a connecting hole in the shell and engaging a threaded hole in the installation body, a sealing ring sleeved on the thread connection member and adapted to be pressed on an installation surface of the shell to seal the connecting hole of the shell, and a gasket sleeved on the thread connection member and adapted to be pressed between the thread connection member and the sealing ring to prevent the thread connection member from being loosened. The gasket has a pair of stopping arms. An angle defined between the stopping arms is greater than 0 degrees and less than 180 degrees. A pair of top ends of the stopping arms are adapted to simultaneously abut against an outer wall of the shell to prevent the gasket from rotating with the thread connection member.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
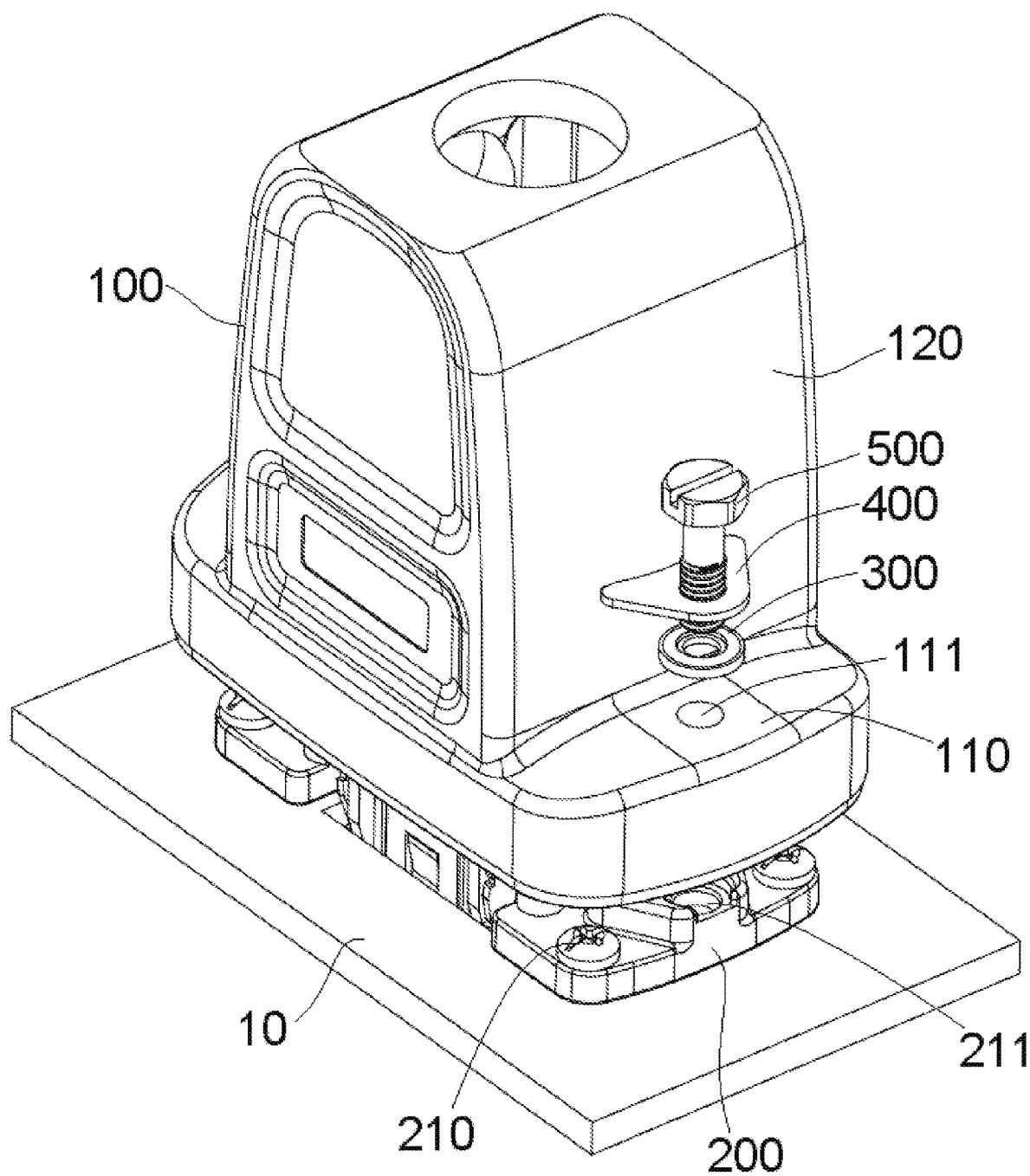
FIG. 1 is a perspective view of a connector according to an embodiment before a shell is locked to an installation body.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiment set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
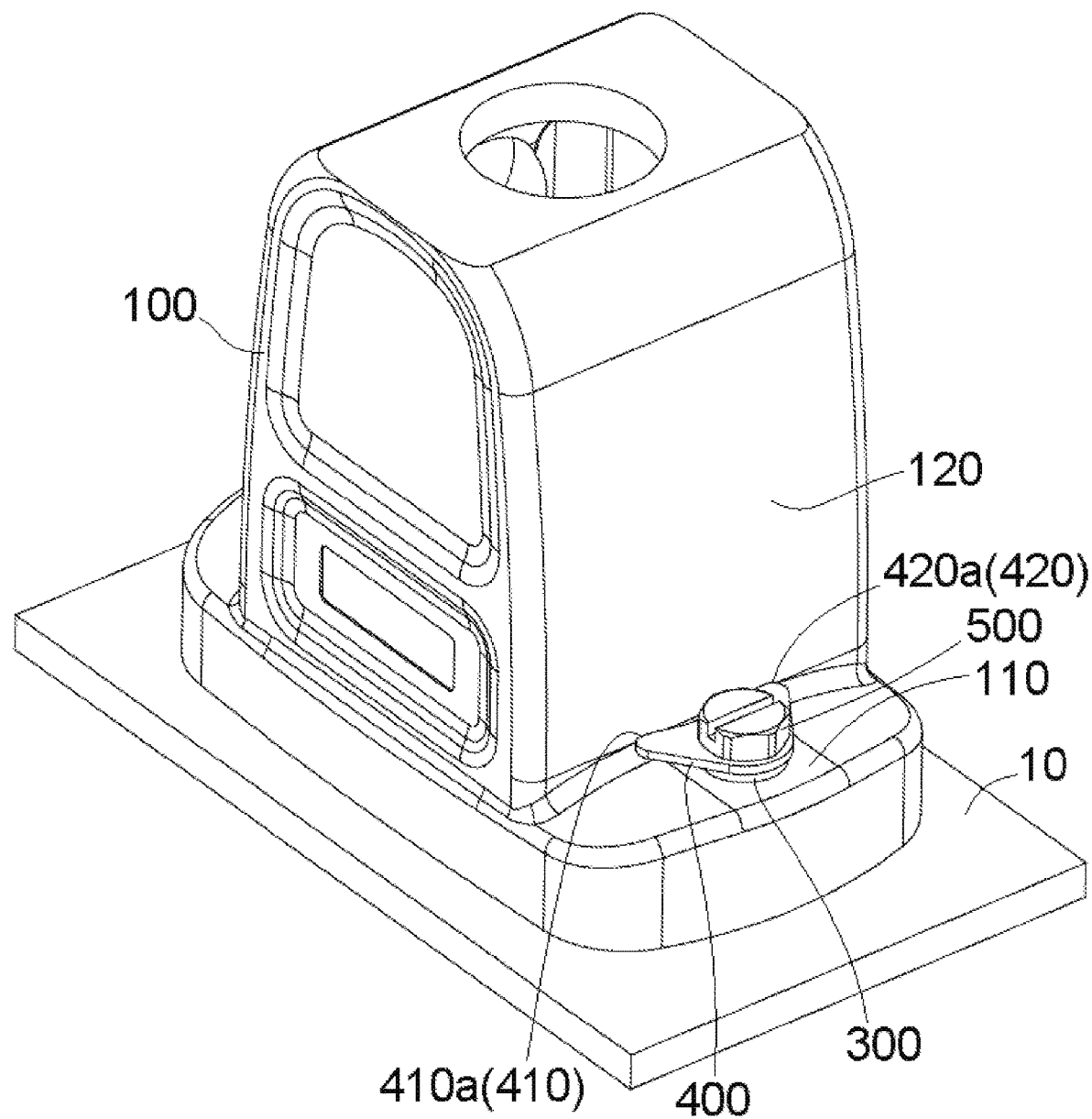
FIG. 2 is a perspective view of the connector of FIG. 1 after the shell is locked to the installation body.

A connector according to an embodiment, as shown in FIGS. 1 and 2, includes a shell 100 and an installation body 200. FIG. 1 shows the connector before the shell 100 is locked to the installation body 200 and FIG. 2 shows the connector after the shell 100 is locked to the installation body 200. In an embodiment, the connector is a heavy load connector.

In the embodiment shown in FIGS. 1 and 2, the installation body 200 may be a flange adapted to be fixedly mounted on a panel 10. The installation body 200 may be fixed to the panel 10 by a screw 210.

As shown in FIGS. 1-2, a locking device is adapted to lock the shell 100 to the installation body 200. As shown in FIG. 1, the locking device includes a thread connection member 500, a sealing ring 300, and a gasket 400. The thread connection member 500 is adapted to pass through a connecting hole 111 in the shell 100 and be screwed into a threaded hole 211 formed in the installation body 200. The sealing ring 300 is sleeved on the thread connection member 500 and is adapted to be pressed on an installation surface 110 of the shell 100, so as to seal the connecting hole 111 of the shell 100. The gasket 400 is sleeved on the thread connection member 500 and adapted to be pressed between the thread connection member 500 and the sealing ring 300, so as to prevent the thread connection member 500 from being loosened.

Figure 3:
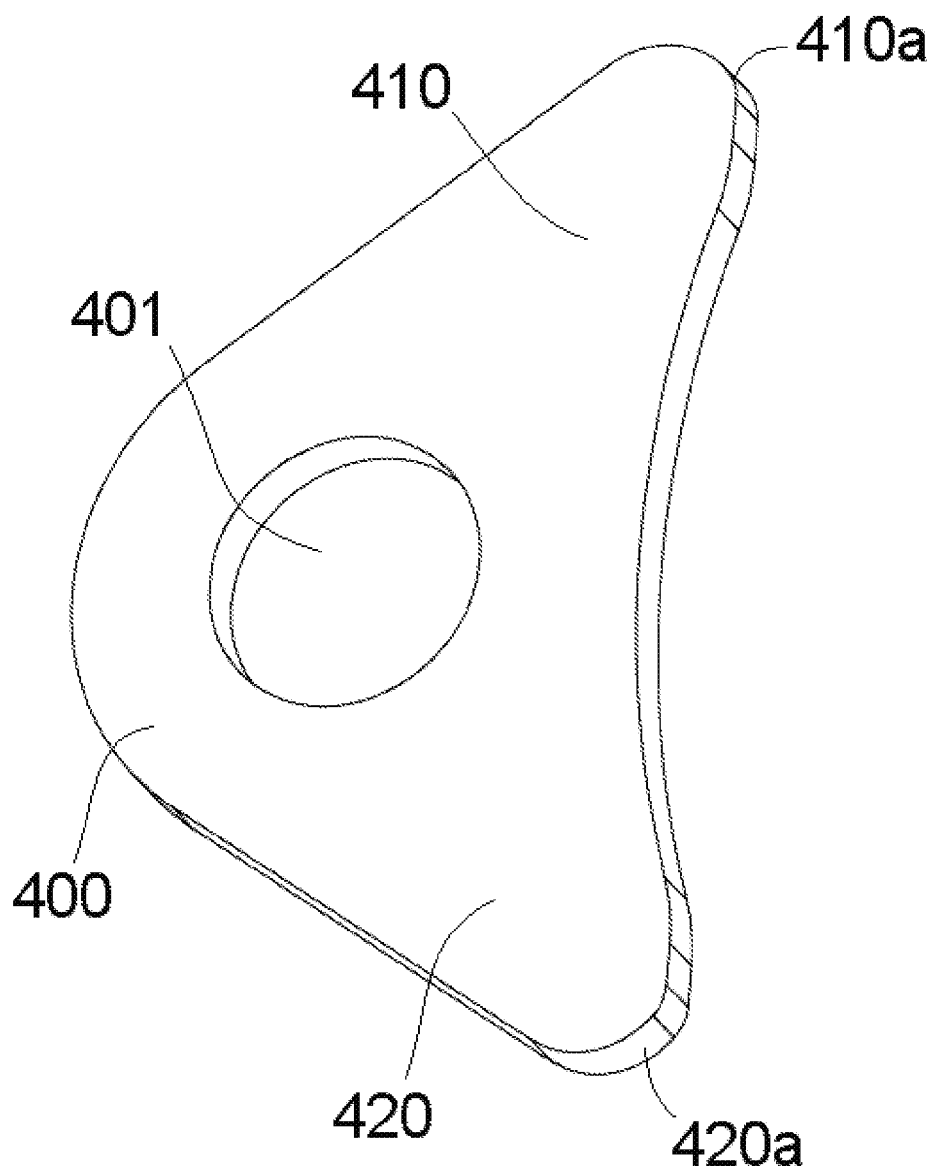
FIG. 3 is a perspective view of a gasket of the connector of FIG. 1.

The gasket 400, as shown in FIG. 3, has a pair of stopping arms 410, 420. An angle defined between the stopping arms 410, 420 is larger than 0 degrees and less than 180 degrees. A pair of top ends 410a, 420a of the stopping arms 410, 420 on the gasket 400 are adapted to simultaneously abut against an outer wall 120 of the shell 100, so as to prevent the gasket 400 from rotating along with the thread connection member 500. Thereby, the sealing ring 300 and the shell 100 may be protected from being worn by the gasket 400, prolonging the service life of the sealing ring 300 and the connector.

As shown in FIG. 3, the top ends 410a, 420a of the stopping arms 410, 420 each have an arc-shaped end surface. The arc-shaped end surface facilitates the installation of the gasket 400 and protects the shell 100 from being impressed with an obvious indentation by the top ends 410a, 420a of the stopping arms 410, 420. A hole 401 is formed in the gasket 400 and the thread connection member 500 passes through the hole 401.

In the embodiment shown in FIG. 3, the gasket 400 has only two stopping arms 410, 420, and the gasket 400 is shaped as a fish tail. For the convenience of manufacture and use, in the embodiment shown in FIG. 3, the gasket 400 has a completely symmetrical structure. In other embodiments, the gasket 400 may have three or more stopping arms 410, 420, and may have any suitable shape.

Figure 8:
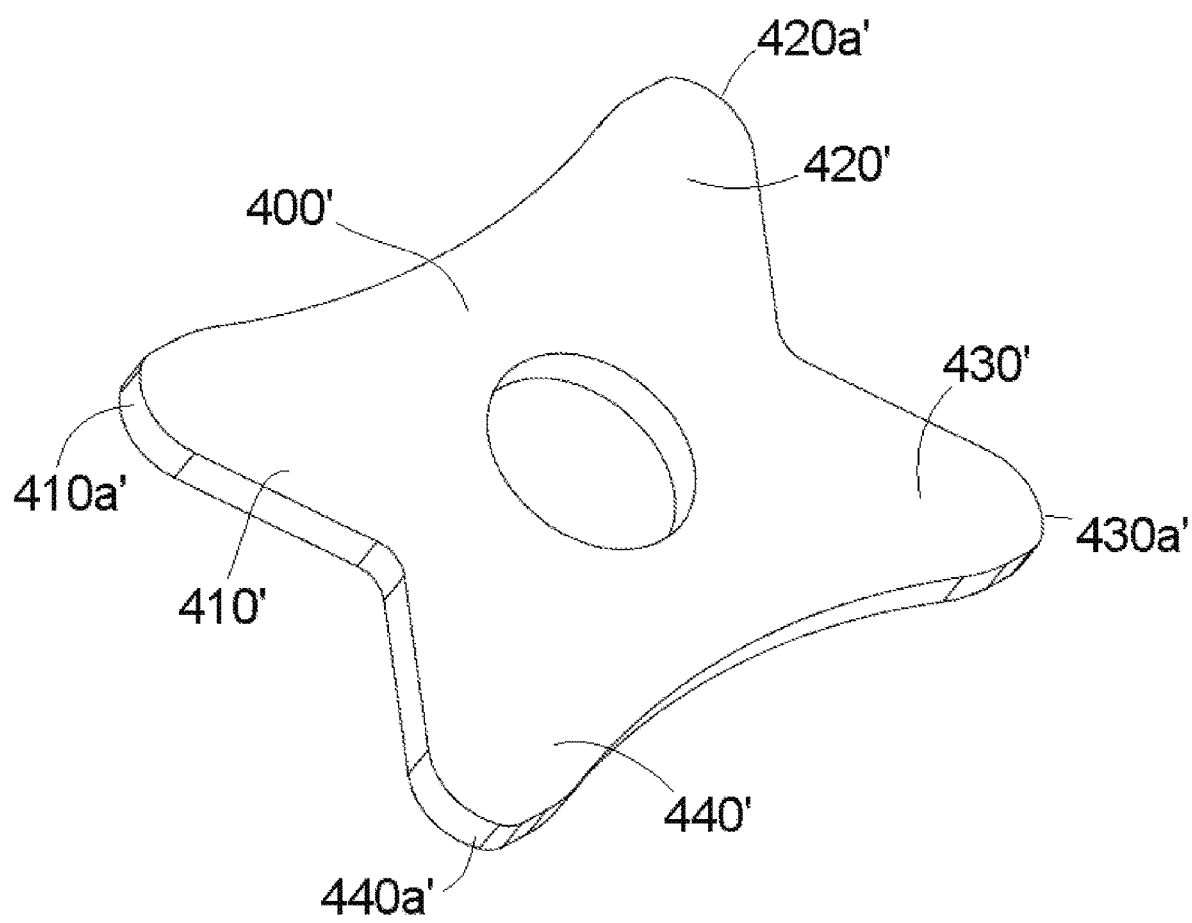
FIG. 8 is a perspective view of a gasket according to another embodiment.
Figure 9:
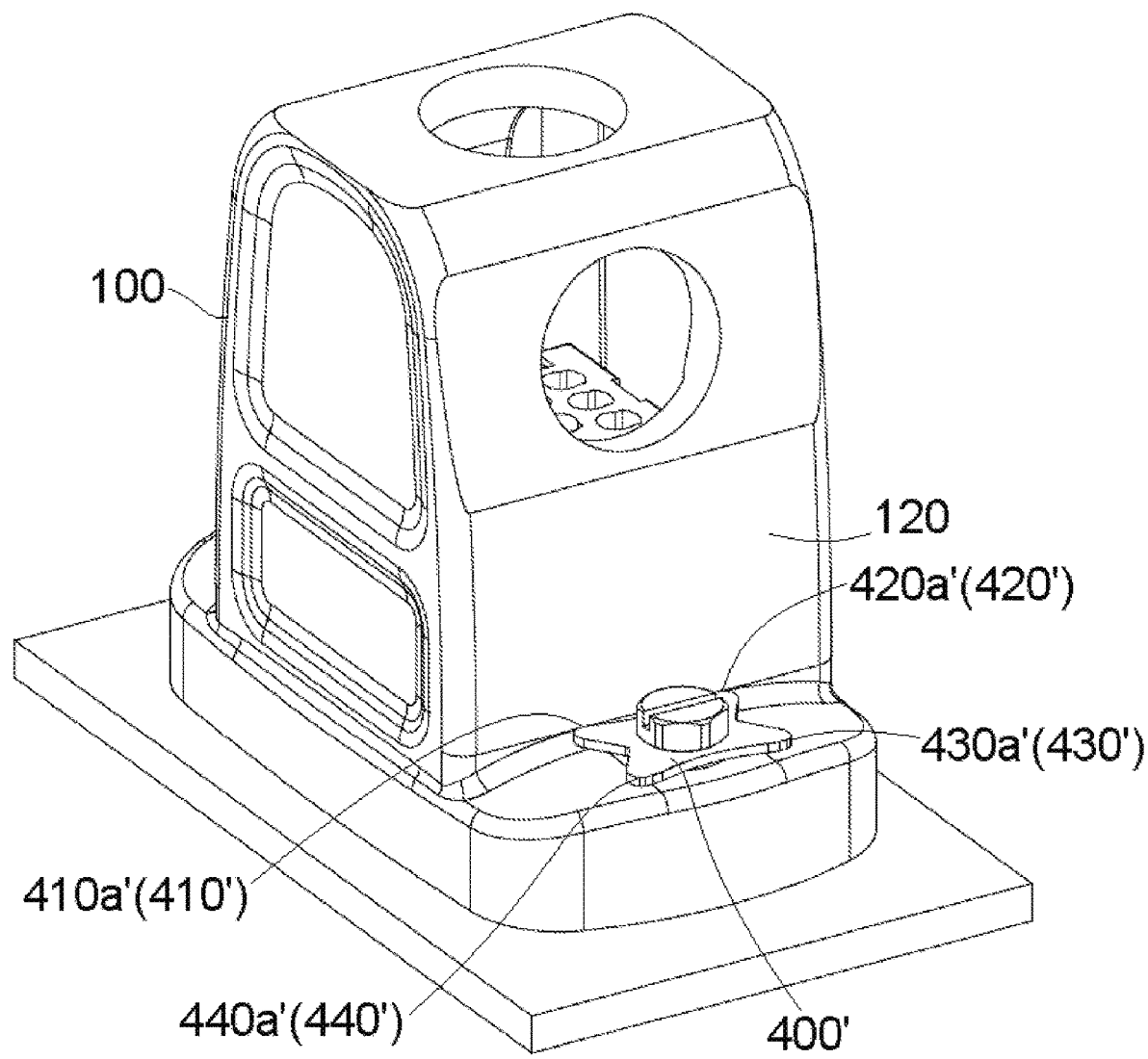
FIG. 9 is a perspective view of a connector according to another embodiment after a shell is locked to an installation body.

A gasket 400' according to another embodiment, as shown in FIGS. 8 and 9, has four stopping arms 410', 420', 430', 440' and is shaped as a four-pointed star. An angle defined between each pair of two adjacent stopping arms of the four stopping arms 410', 420', 430', and 440' is larger than 0 degrees and less than 180 degrees. Top ends 410a', 420a', 430a', 440a' of the two adjacent stopping arms on the gasket 400' are adapted to simultaneously abut against an outer wall 120 of the shell 100, so as to prevent the gasket 400' from rotating along with the thread connection member 500. For the convenience of manufacture and use, in the embodiment shown in FIGS. 8-9, the gasket 400' has a completely symmetrical structure.

As shown in FIGS. 2 and 9, in an embodiment, the gasket 400, 400' is pressed between a head of the thread connection member 500 and the sealing ring 300 after the shell 100 is locked to the installation body 200 by the locking device. The sealing ring 300 is pressed on the shell 100 by the gasket 400, 400'. The sealing ring 300 is covered by the gasket 400, 400' to prevent the sealing ring 300 from being exposed outside after locking the shell 100 to the installation body 200 with the locking device.

Figure 4:
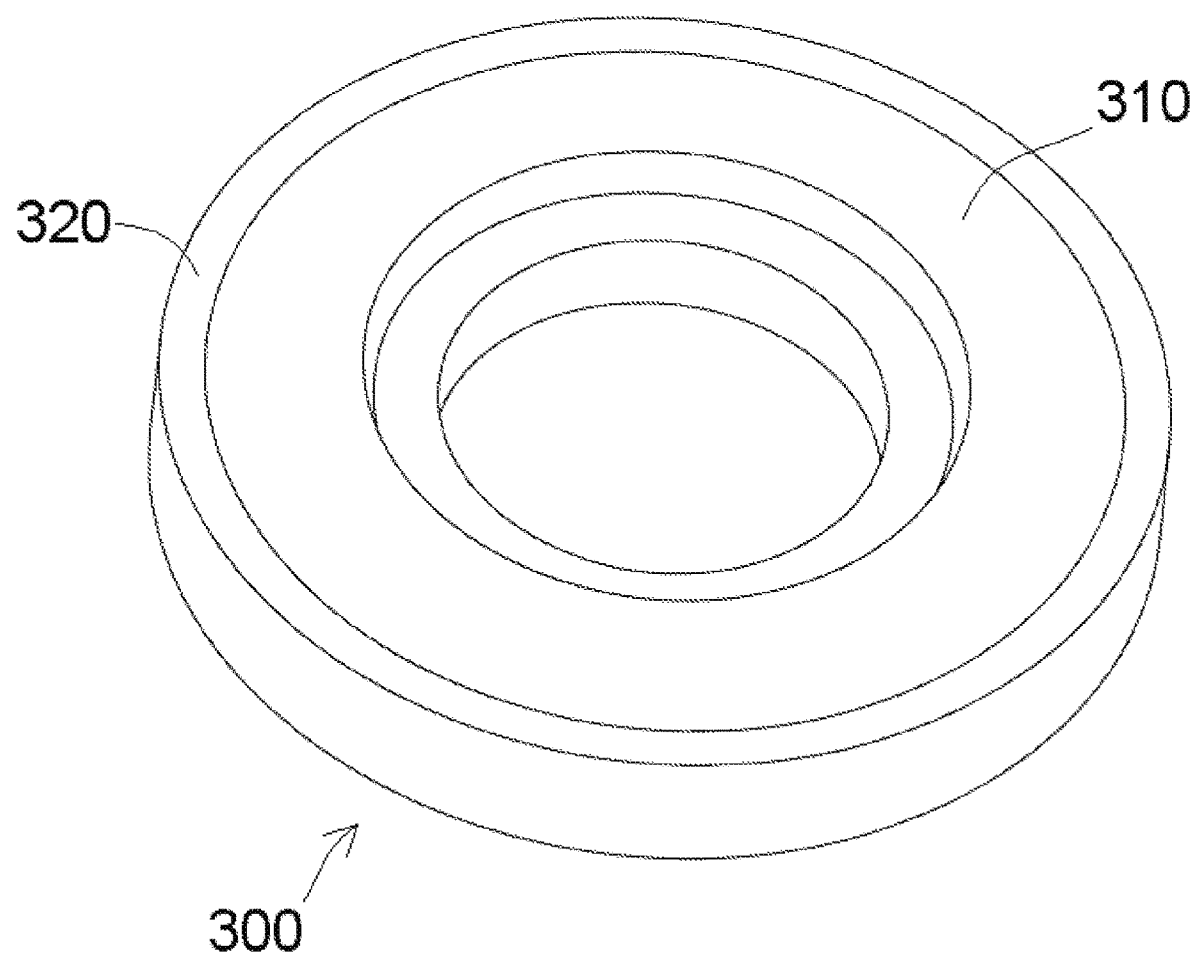
FIG. 4 is a perspective view of a sealing ring of the connector of FIG. 1.
Figure 5:
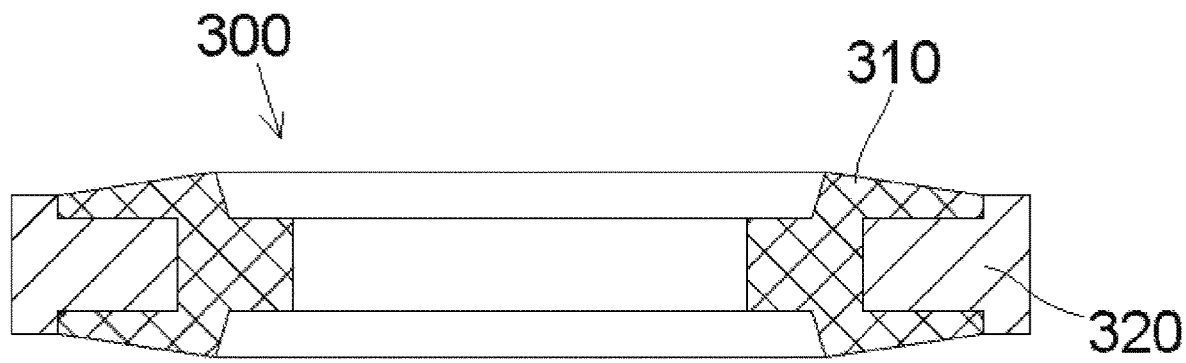
FIG. 5 is a sectional side view of the sealing ring of FIG. 4.

The sealing ring 300, as shown in FIGS. 4 and 5, includes an elastic ring 310 and a rigid ring 320 provided on an outer side of the elastic ring 310. In an embodiment, the elastic ring 310 may be made of elastic material, for example, rubber. The rigid ring 320, in various embodiments, is made of steel, stainless steel or copper. In an embodiment, the elastic ring 310 may be molded on the rigid ring 320 by insertion molding. The rigid ring 320 is configured to force the elastic ring 310 to elastically deform inwardly in a radial direction when the elastic ring 310 is pressed in an axial direction, instead of elastically deforming outwardly in the radial direction. In this way, when the elastic ring 310 is pressed in the axial direction, it will elastically deform inwardly in the radial direction, and may reliably and tightly hold the thread connection member 500, which increases the sealing effect. An end face of the elastic ring 310 protrudes outward by a predetermined height in the axial direction relative to an end face of the rigid ring 320, so that the elastic ring 310 may be pressed and deformed by the gasket 400.

Figure 6:
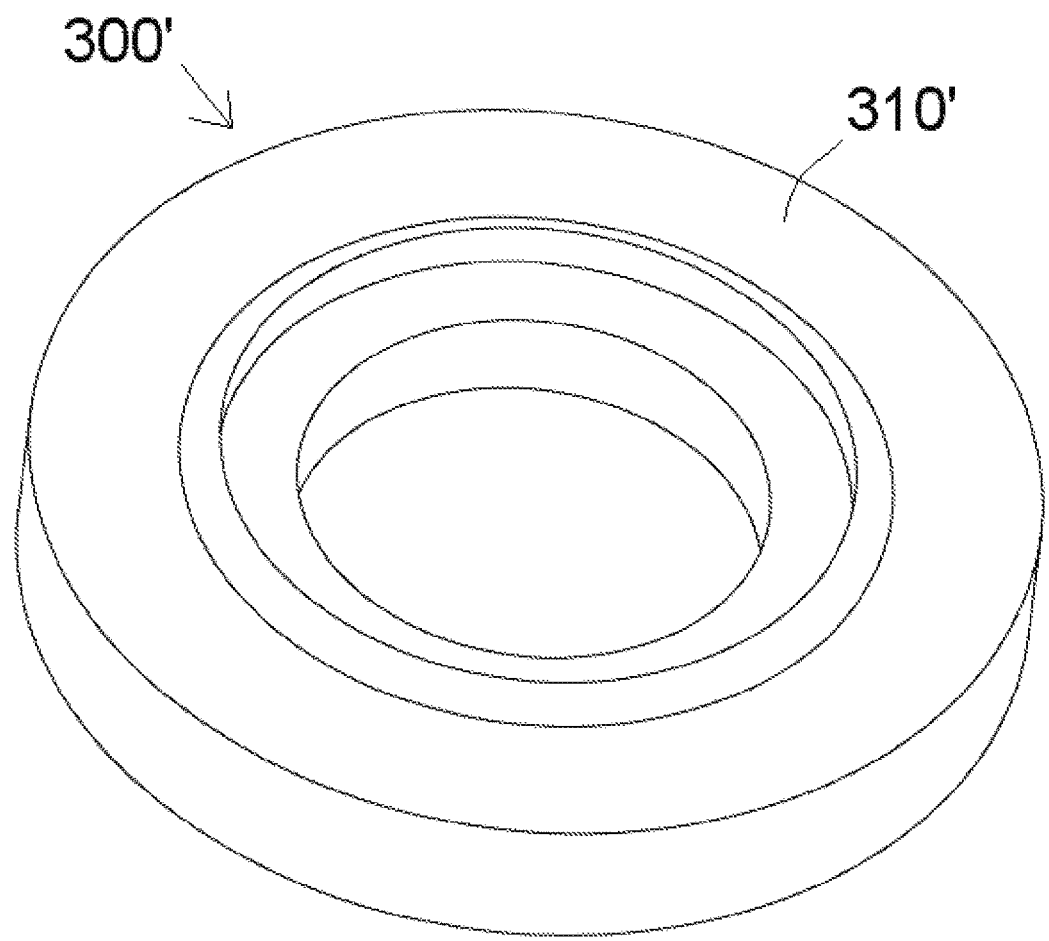
FIG. 6 is a perspective view of a sealing ring according to another embodiment.
Figure 7:
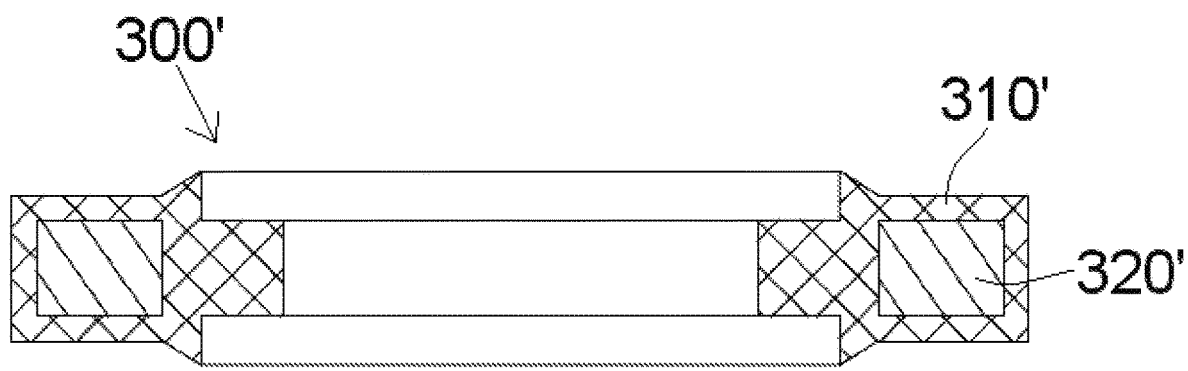
FIG. 7 is a sectional side view of the sealing ring of FIG. 6.

A sealing ring 300' according to another embodiment, as shown in FIGS. 6 and 7, includes an elastic ring 310' and a rigid ring 320' in an inner space of and within the elastic ring 310'. In an embodiment, the elastic ring 310' may be made of elastic material, for example, rubber. The rigid ring 320', in various embodiments, is made of steel, stainless steel, or copper. In an embodiment, the elastic ring 310' may be molded on the rigid ring 320' by insertion molding. The rigid ring 320' is configured to force the elastic ring 310' to elastically deform inwardly in a radial direction when the elastic ring 310' is pressed in the axial direction. In this way, when the elastic ring 310' is pressed in the axial direction, it will elastically deform inwardly in the radial direction, and may reliably and tightly hold the thread connection member 500, which increases the sealing effect. An end face of the elastic ring 310' protrudes outward by a predetermined height in the axial direction relative to an end face of the rigid ring 320', so that the elastic ring 310' may be pressed and deformed by the gasket 400.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A locking device adapted to lock a shell to an installation body, comprising:
   a thread connection member extending through a connecting hole in the shell and engaging a threaded hole in the installation body;
   a sealing ring sleeved on the thread connection member and adapted to be pressed on an installation surface of the shell to seal the connecting hole of the shell; and
   a gasket sleeved on the thread connection member and adapted to be pressed between the thread connection member and the sealing ring to prevent the thread connection member from being loosened, the gasket has a pair of stopping arms, an angle defined between the stopping arms is greater than 0 degrees and less than 180 degrees, each stopping arm comprises a top end, the top ends of the pair of stopping arms are adapted to simultaneously abut against an outer wall of the shell to prevent the gasket from rotating with the thread connection member.

2. The locking device of claim 1, wherein each of the top ends has an arc-shaped end surface.

3. The locking device of claim 1, wherein the gasket has only the pair of stopping arms.

4. The locking device of claim 3, wherein the gasket is shaped as a fish tail.

5. The locking device of claim 1, wherein the gasket has four stopping arms.

6. The locking device of claim 5, wherein the gasket is shaped as a four-pointed star.

7. The locking device of claim 1, wherein the gasket has a symmetrical structure.

8. The locking device of claim 1, wherein the sealing ring is covered by the gasket after locking the shell to the installation body and the gasket prevents the sealing ring from being exposed.

9. The locking device of claim 1, wherein the sealing ring includes an elastic ring and a rigid ring disposed on an outer side of the elastic ring.

10. The locking device of claim 9, wherein the rigid ring is configured to force the elastic ring to elastically deform inwardly in a radial direction when the elastic ring is pressed in an axial direction so that the elastic ring secures the thread connection member.

11. The locking device of claim 1, wherein the sealing ring includes an elastic ring and rigid ring disposed within the elastic ring.

12. The locking device of claim 11, wherein the rigid ring is configured to force the elastic ring to elastically deform inwardly in a radial direction when the elastic ring is pressed in an axial direction so that the elastic ring secures the thread connection member.

13. The locking device of claim 10, wherein an end face of the elastic ring protrudes outward by a predetermined height relative to an end face of the rigid ring.

14. The locking device of claim 12, wherein an end face of the elastic ring protrudes outward by a predetermined height relative to an end face of the rigid ring.

15. The locking device of claim 1, wherein the gasket is pressed between a head of the thread connection member and the sealing ring after the shell is locked to the installation body.

16. A connector, comprising:

a shell;

an installation body; and a locking device adapted to lock the shell to the installation body, the locking device including a thread connection member extending through a connecting hole in the shell and engaging a threaded hole in the installation body, a sealing ring sleeved on the thread connection member and adapted to be pressed on an installation surface of the shell to seal the connecting hole of the shell, and a gasket sleeved on the thread connection member and adapted to be pressed between the thread connection member and the sealing ring to prevent the thread connection member from being loosened, the gasket has a pair of stopping arms, an angle defined between the stopping arms is greater than 0 degrees and less than 180 degrees, each stopping arm comprises a top end, the top ends of the pair of stopping arms are adapted to simultaneously abut against an outer wall of the shell to prevent the gasket from rotating with the thread connection member.

17. The connector of claim 16, wherein the installation body is a flange adapted to be fixedly mounted on a panel.

18. The connector of claim 17, wherein the installation body is adapted to be fixed to the panel by a screw.

* * * * *